United States Patent [19]
Saji

[11] Patent Number: 5,915,916
[45] Date of Patent: Jun. 29, 1999

[54] ACTUATOR

[75] Inventor: Nobuhito Saji, Gunma, Japan

[73] Assignee: NSK Ltd., Tokyo, Japan

[21] Appl. No.: 08/852,739

[22] Filed: May 7, 1997

[30] Foreign Application Priority Data

May 8, 1996 [JP] Japan .................................. 8-113892

[51] Int. Cl.[6] .................................................. B65G 25/04
[52] U.S. Cl. ..................... 414/749; 198/468.9; 198/860.3
[58] Field of Search .................................. 414/749; 901/1; 198/468.9, 468.01, 493, 860.3, 735.1

[56] References Cited

U.S. PATENT DOCUMENTS

| 4,044,886 | 8/1977 | Sender | 414/749 X |
| 4,818,169 | 4/1989 | Schram | 414/749 X |

FOREIGN PATENT DOCUMENTS

| 7-7837 | 2/1995 | Japan | B23Q 11/08 |
| 8-290384 | 11/1996 | Japan | B25J 19/00 |

*Primary Examiner*—Donald W. Underwood
*Attorney, Agent, or Firm*—Sughrue, Mion, Zinn, Macpeak & Seas, PLLC

[57] ABSTRACT

An actuator includes: a housing having a slit in the outer surface in such a manner that the slit is elongated in the direction of axis, and a conveying member which is supported by a linear guide device in such a manner that the conveying member is movable axially, and is moved back and forth by a moving device along the slit, the conveying member having a portion which is protruded from the housing through the slit, and engaging with a movable loop made up of a seal belt which is laid over pulleys in such a manner that the seal belt is movable in the direction of axis while sealingly closing the slit. In the actuator, an auxiliary space communicated with outside is provided along a main space in the housing, and the main space and the auxiliary space are communicated through exhaust valves with each other which are provided at both ends of the main space and allow air to flow, in one direction, to the auxiliary space. Hence, the actuator is a non-suction type clean actuator.

9 Claims, 5 Drawing Sheets

DISCHARGE
OUTSIDE
CLEAN ROOM

ACTUATOR

BACKGROUND OF THE INVENTION

This invention relates to an improvement of a dust-proof actuator having a carriage which is built in a housing and is linearly driven in the axial direction.

An example of a conventional dust-proof clean actuator has been disclosed, for instance, by Japanese Utility Patent Unexamined Publication No. Hei. 7-7837. The dust-proof clean actuator, as shown in FIG. 1, comprises: a linear guide device 101; a carriage 102 guided by the linear guide device 101; and a drive device 103 which drives the carriage in the axial direction with the aid of a ball screw. The linear guide device 101, the carriage 102 and the drive device 103 are built in a housing 100. The housing 100 has a slit in its one surface which is elongated in the direction of movement of the carriage 102. A part of the carriage 102 is protruded from the housing 100 through the slit so that a carrying table (not shown) is mounted on it. A plurality of pulleys 105 are arranged at both ends of the housing 100, and seal belts are laid on those pulleys, thus forming a movable loop. The carriage 102 is coupled to the movable loop thus formed. The movable loop closes the slit, to prevent dust such as metal powder or grease particles produced inside the housing from scattering outside.

The above-described conventional dust-proof actuator suffers from the following difficulty: In the case when the carriage 102 is moved at high speed, in the housing the air in front of the carriage as viewed in the direction of movement of the carriage 102 becomes higher in pressure than the outside air pressure, so that the air may leak out through the slit which ought to be kept closed with the seal belt 106.

Hence, in order to use the above-described dust-proof actuator, for instance, as a part carrying robot in a dust-less/clean room in which the scattering of even a considerably small quantity of extremely small dust particles is not permitted, the actuator must be modified as shown in FIG. 2. That is, the actuator is covered with a cover 110, and a discharge pump 112 is operated to discharge the air from the inside of the cover 110, to form a negative pressure therein, thereby to completely prevent the scattering of extremely small dust particles. Particularly, the use of the discharge pump 112 for forming the negative pressure in the inside of the cover 110 makes the structure of the dust-proof actuator complicated and troublesome. This is a problem.

SUMMARY OF THE INVENTION

Accordingly, an object of the invention is to eliminate the above-described difficulty accompanying a conventional dust-proof actuator.

More specifically, an object of the invention is to provide a complete dust-proof non-suction type clean actuator which is free from the problem that it is necessary to cover the actuator body with a cover, and to employ a discharge pump to form negative pressure therein.

The foregoing object and other objects of the invention have been achieved by the provision of an actuator which includes:

a housing having an outer surface on which a slit elongated in an axial direction of the housing is formed;

a conveying member having a portion protruded from the housing through the slit, the portion of the conveying member being movable back and forth along the slit in the axial direction;

a seal belt for sealingly closing the slit, the seal belt being movable in the axial direction in accordance with the movement of the conveying member; and one-way exhaust valves disposed at both ends of the housing in the axial direction for allowing air disposed in the housing to flow in one direction towards the outside of the housing when the conveying member is being moved.

In the actuator of the invention, the one-way exhaust valves cooperate with the movement of the conveying member in the axial direction, to discharge the air in the internal chamber of the housing towards outside of said housing, and to prevent the back flow of air, whereby negative pressure is formed in the housing without the use of a discharge pump, so that the dust particles formed by the operation of moving elements or device in the housing are prevented from scattering out of the housing.

In the above-mentioned actuator, the housing may comprise a partition member for partitioning the inside of the housing into a main chamber within which said conveying member is moved and an auxiliary chamber communicated with the outside, wherein the one-way exhaust valves are provided at both ends of the main chamber in the axial direction and allow air within the main chamber to flow, in one direction, to the auxiliary chamber.

In the above-mentioned actuator, the auxiliary chamber may be communicated with the outside through duct members.

In the above-mentioned actuator, the actuator may further comprise auxiliary one-way exhaust valves which is provided at both ends of the auxiliary chamber in the axial direction and also allows air within the auxiliary chamber to flow, in one direction, to the duct members; and driven member which is coupled with the seal belt and is movable within the auxiliary chamber in a direction opposite to the moving direction of the conveying member.

In the above-mentioned actuator, the actuator may further comprise a plurality of pulleys on which the seal belt is laid over in such a manner that a movable loop is made up of the seal belt.

In the above-mentioned actuator, the conveying member may comprise a through hole elongated in the axial direction for communicating a front and rear chamber which are respectively defined by a space ahead of the conveying member and a apace behind the conveying member when the conveying member is being moved within the housing.

In the above-mentioned actuator, the actuator may further comprise exhausting valves disposed at both ends of the through hole in the axial direction for allowing the air within the housing to flow out of the conveying member.

In the above-mentioned actuator, an internal chamber of the housing may be communicated with the outside through the one-way exhausting valves and a duct member.

The nature, utility and principle of the invention will be more clearly understood from the following detailed description and the appended claim when read in conjunction with the accompanying drawing.

DETAILED DESCRIPTION OF THE INVENTION

Preferred embodiments of the invention will be described with reference to the accompanying drawings.

(First Embodiment)

Figure 1:
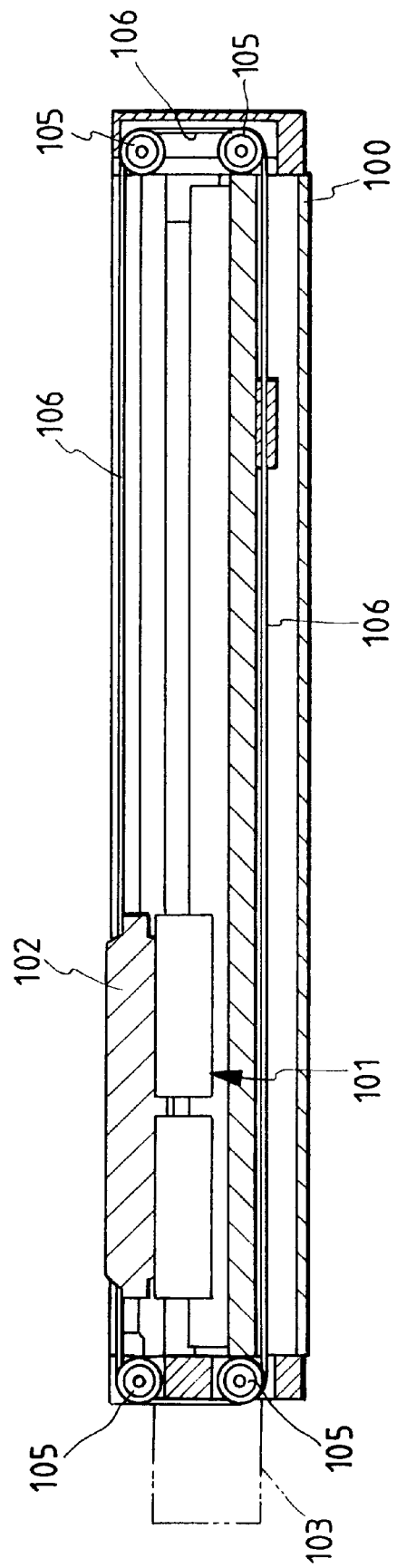
FIG. 1 is a longitudinal sectional view showing a conventional dust-proof type actuator.
Figure 2:
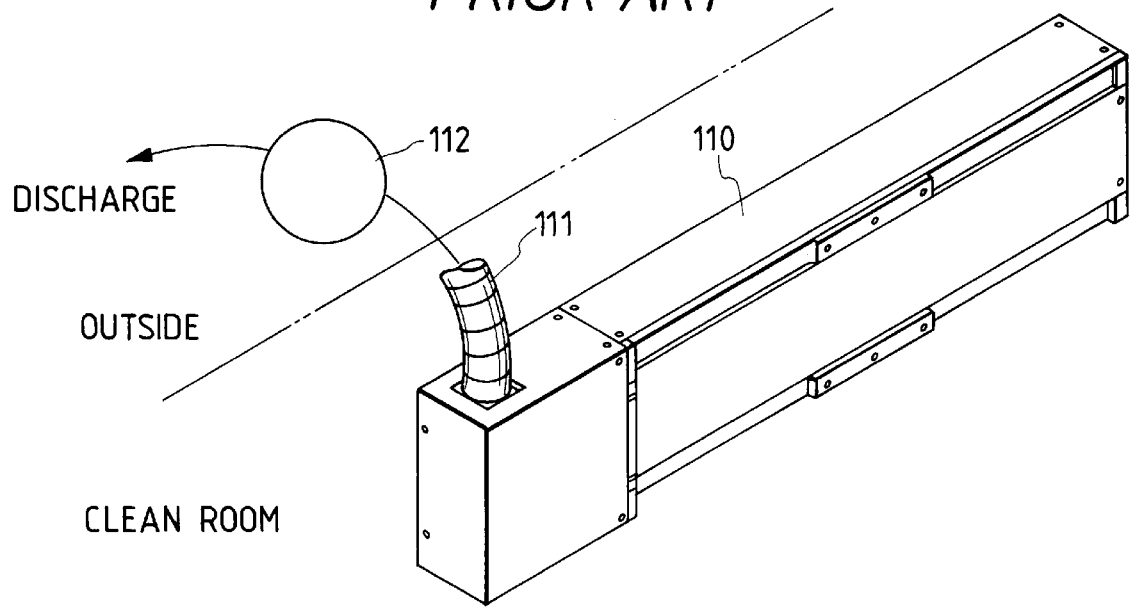
FIG. 2 is a perspective view showing the conventional dust-proof type actuator which is modified into a suction type actuator by applying a discharge pump thereto.
Figure 3:
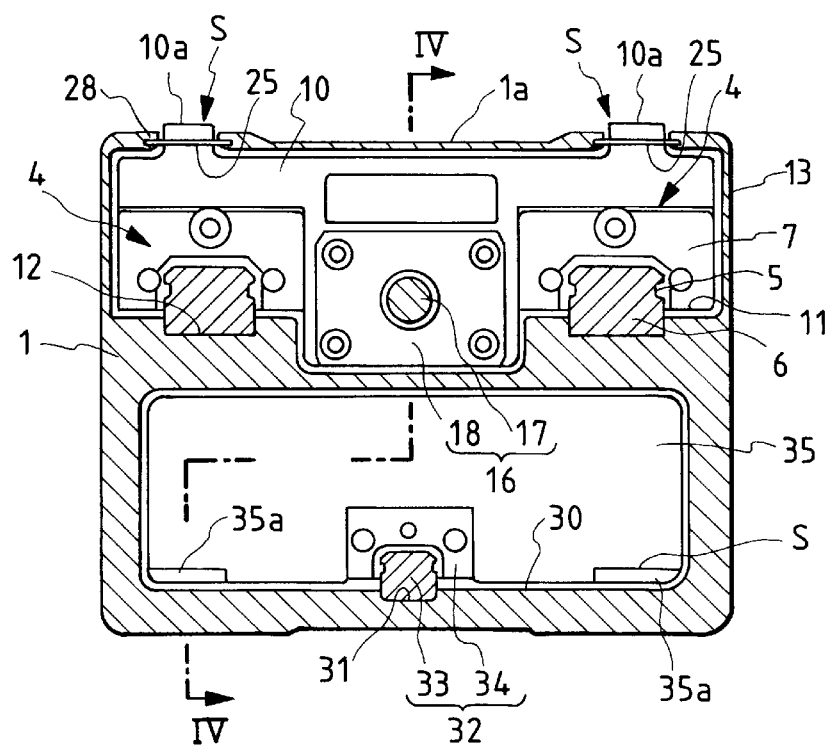
FIG. 3 is a cross sectional view showing an example of a non-suction clean actuator, which is a first embodiment of the invention.
Figure 4:
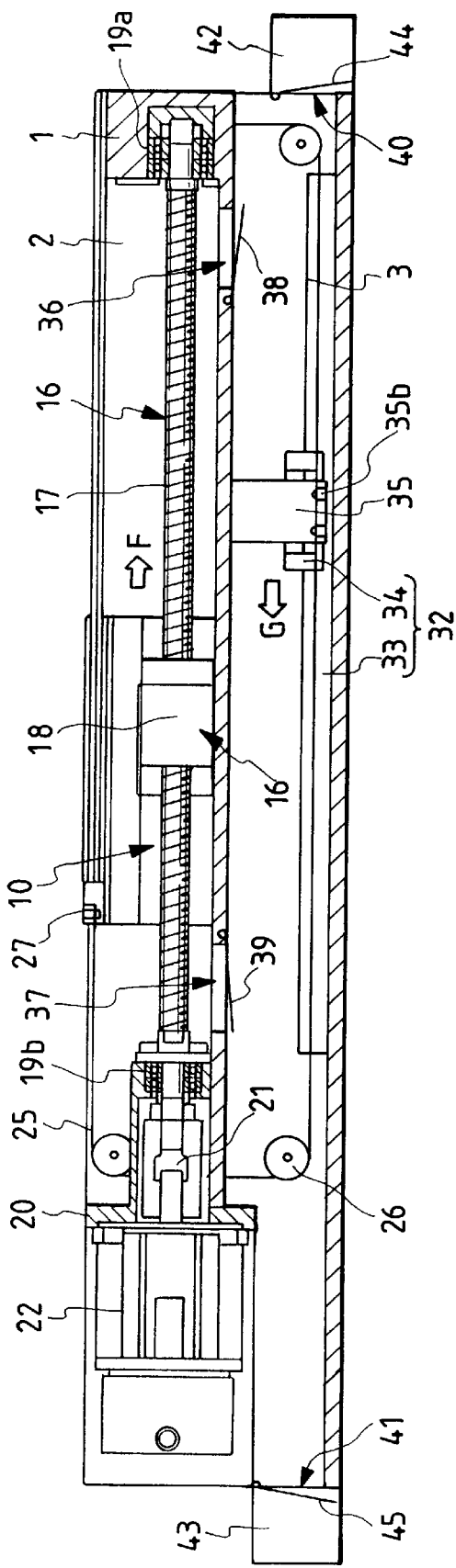
FIG. 4 is a sectional view taken along line IV—IV in FIG. 3.

An example of a non-suction clean actuator, which constitutes a first embodiment of the invention, is as shown in FIGS. 3 and 4.

The actuator is constructed as follows:

The inside of a housing 1, which is elongated in the axial direction, is divided into two chambers, namely, an upper chamber 2 (hereinafter referred to as "a main chamber 2", when applicable), and a lower chamber 3 (hereinafter referred to as "an auxiliary chamber 3", when applicable).

In the main chamber 2, a pair of linear guide devices 4 and 4 are arranged in parallel with each other, and a conveying member, namely, a main carrier 10 is supported on the linear guide devices in such a manner that it is movable in the axial direction. The main carrier 10 is substantially T-shaped in section, and has a width slightly smaller than the distance between the inner surfaces of both opposite side walls of the housing 1. The upper surface of the main carrier 10 has right and left seats 10a near its right and left ends so that a workpiece-to-be conveyed is mounted on them. Each of the linear guide devices 4 comprises: a guide rail 6 which is substantially rectangular in section and has a pair of rolling-element rolling grooves 5 in its right and left side surfaces; and a slider 7 which is substantially U-shaped in section and laid over the guide rail 6, and has a pair of rolling-element rolling grooves (not shown) in its inner side surfaces which are confronted with the aforementioned rolling-element rolling grooves 5 of the guide rail; and a number of rolling elements (not shown) which circulates while rolling in the above-described rolling-element rolling grooves. The sliders 7 are rolling sliders which are smoothly slid on the guide rails 6 in the axial direction with the aid of the rolling motion of the rolling elements.

The guide rails 6 of the linear guide devices 4 are fixedly secured in grooves 12 and 12 which are formed in the right and left end portions of the floor 11 of the main chamber 2 in such a manner that they are extended in the axial direction. The sliders 7 are mounted on the guide rails 6 in such a manner that the lower surfaces of the slider 7 are disposed slightly above the floor surface 11. The sliders 7 are respectively secured to the lower surfaces of the right and left wings of the main carrier 10 which is T-shaped in section. Thus, the main chamber 2 defined by the floor surface 11, the side walls 13, and the cover 1a of the housing is axially divided by the main carrier 10 and the linear guide devices 4 supporting the main carrier 10 with gaps left to the extent that the main carrier 10 and the linear guide devices will not brought into contact with the floor surface 11, the side walls 13, and the cover 1a. Thus, the main carrier 10 serves also as a piston.

In the embodiment, in order to accurately move the main carrier 10 to a selected position at a selected speed, a ball screw 16 is employed (hereinafter referred to as "a moving device" when applicable). The ball screw 16 comprises: a screw shaft 17 whose length corresponds to the length of the main chamber 2; and a ball screw nut 18 which is engaged with the screw shaft 17 through a number of balls. One end portion of the screw shaft is supported on the housing through a bearing 19a, and the other end portion is supported on a motor housing 20 through a bearing 19b and coupled through a coupling 21 to a motor 22 (such as an AC servo motor). The ball screw nut is secured to the lower portion of the main carrier 10.

The housing 1 has a pair of parallel slits S and S in both edge portions of a cover 1a which covers the upper surface of the housing 1 in such a manner that the slits S are elongated in the axial direction, and the workpiece mounting seats 10a of the main carrier 10 are protruded from the slits S, thus appearing outside. In order to sealingly cover the two slits S, a pair of right and left belt-type dust-proof devices which are constituted by the movable loops made up of seal belts 25 are provided in the housing 1. Those belt type dust-proof devices are equal in construction to each other, and therefore, only one of them will be described. At both ends of the housing 1 as viewed in the axial direction, four pulleys 26 are arranged; more specifically, two pulleys are in the upper main chamber 2, and two pulleys are in the lower auxiliary chamber 3. One end of the seal belt 25 is secured to one end of the main carrier 10 with screws 27, and then the seal belt 25 are laid over the four pulleys 26 while extending through the lower auxiliary chamber 3, and the other end of the seal belt 25 is secured to the other end of the main carrier 10. Thus, the movable loop is made up of the seal belt 25. The slit S has belt seal grooves 28 in the opposite edges of its opening, and the opposite edges of the seal belt 25 are engaged with the belt seal grooves 28, respectively, whereby the slits are effectively sealed up.

The material of the seal belt 25 may be freely selected. However, a thin metal belt-shaped plate, a flat belt impregnated with polyurethane, and so on are preferable as the material.

The floor surface 30 of the auxiliary chamber 3 has a groove 31 formed along the central axis, and the lower portion of a guide rail 33 of a driven linear guide device is buried in the groove 31. A slider 34 is mounted on the guide rail 33, and a driven carrier 35 is mounted on the slider 34 in such a manner that the former 35 is integral with the slider 34. The sectional configuration of the driven carrier 35 is such that a slight gap is formed between the driven carrier 35 and the wall surface of the auxiliary chamber 3. The driven carrier 35 has a pair of grooves 35a in the lower surfaces of the right and left end portion thereof. The aforementioned seal belts 25 are inserted in the grooves 35a, respectively. The driven carrier 35 is fixedly secured on the seal belts 25 with screws 35b. Hence, the driven carrier 35 serves as a piston which is axially moved in the auxiliary chamber while being guided as the seal belts 25 are driven.

The main and auxiliary chambers 2 and 3 thus constructed are communicated with each other through openings 36 and 37 which are formed near both end portions thereof as viewed in the axial direction. The openings 36 and 37 are provided with exhaust valves 38 and 39, respectively, which allow air to flow in one way from the main chamber 2 to the auxiliary chamber 3.

The auxiliary chamber 3 has openings 40 and 41 at both ends thereof as viewed in the axial direction. The opening 40 and 41 are connected to exhaust ducts 42 and 43, respectively. The exhaust ducts 42 and 43 are provided with exhaust valves 44 and 45, respectively, which allow air to flow in one direction from the auxiliary chamber to the exhaust ducts 42 and 43.

Now, the operation of the actuator thus constructed will be described hereinafter.

A workpiece (not shown) to be conveyed is secured to the right and left workpiece mounting seats 10a of the main carrier with bolts which are protruded from the upper cover 1a of the housing 1 through the slits S.

It is assumed that, in FIG. 4, the main carrier 10 is stopped near the motor 22.

Under this condition, the motor 22 is turned in the forward direction. Thereupon, the torque of the motor 22 turns the screw shaft 17 of the ball screw 16 in the forward direction. In response to the rotation of the screw shaft 17, the nut 18 is moved in the direction of the arrow F, and therefore the main carrier 10 is moved in the same direction. Thus, the main carrier 10 is moved in the main chamber 2 of the housing 1 while being guided by the linear guide devices 4, so that the workpiece is conveyed. When the main carrier 10 is moved, the seal belts sealingly close the slits S. As the seal belts 25 are driven, the driven carrier 35 secured to the seal belts 25 is moved in the auxiliary chamber 3 in the direction of the arrow G at the same speed which is opposite to the direction (the arrow F) of movement of the main carrier 10.

As the main carrier 10 is moved in the direction of the arrow F, in the main chamber 2 the volume ahead of the main carrier 10 is decreased, while in the auxiliary chamber 3 the volume behind the driven carrier 35 is increased by moving the driven carrier 35 in the direction of the arrow G. In this case, the exhaust valve 38 is opened while the exhaust valve 44 is closed. Since the auxiliary chamber 3 is larger than the main chamber in the cross section, negative pressure is formed ahead of the main carrier 10 in view of the difference in the cross section between the auxiliary and main chambers.

Further, as the main carrier 10 is moved in the direction of the arrow F, in the main chamber 2 the volume behind the main carrier 10 is increased, while in the auxiliary chamber 3 the volume ahead of the driven carrier 35 is decreased. In this case, the exhaust valve 39 is closed while the exhaust valve 45 is opened. While the exhaust valve 39 is kept closed, the volume behind the main carrier 10 is increased, so that, in the main chamber 2, negative pressure is formed behind the main carrier 10. The air in the part of the auxiliary chamber 3 which is provided ahead of the driven carrier 35 and is decreased in volume, is caused to flow through the open exhaust valve 45 into the exhaust duct 43, thus being discharged out of the clean room.

When the motor 22 is turned in the reverse direction to move the main carrier 10 in the reverse direction, operations are carried out which are opposite to the above-described ones. That is, similarly as in the above-described case, negative pressure is formed in the front and rear parts of the main chamber which are ahead of the main carrier 10 and behind the main carrier 10, so that the air compressed in the part of the auxiliary chamber 3 which is ahead of the driven carrier 35 is discharged through the exhaust valve 44.

The pressure in the main chamber 2 which is large in the quantity of dust is kept negative at all times without use of a discharge pump. Hence, even if the linear guide devices 4 and the ball screw form extremely small dust particles, the dust will never leak out of the actuator; that is, they are discharged out of the clean room together with the stream of air which is discharged through the exhaust duct.

The main carrier 10 may have a through-hole which is extended in the axial direction. In this modification, too, the pressure in the main chamber 2 is kept negative by the operation of the main carrier 10, which prevents the scattering of dust formed therein.

(Second Embodiment)

Another example of the non-suction clean actuation, which constitutes a second embodiment of the invention, will be described with reference to FIGS. 5 and 6.

The second embodiment is different from the above-described first embodiment in the following points: The auxiliary chamber 3 accommodating the driven carrier 35 is eliminated, and instead an exhaust duct 51 is coupled, as an auxiliary chamber, to the housing 1, and the main chamber 2 is communicated with the exhaust dust 51 only through the exhaust valves 38 and 39. And the main carrier 10 has a through-hole 50 extended in the axial direction, and the front and rear openings of the through-hole 50 are provided with exhaust valves 52 and 53, respectively, in such a manner that the air is allowed only to flow out of the main carrier 10.

Figure 5:
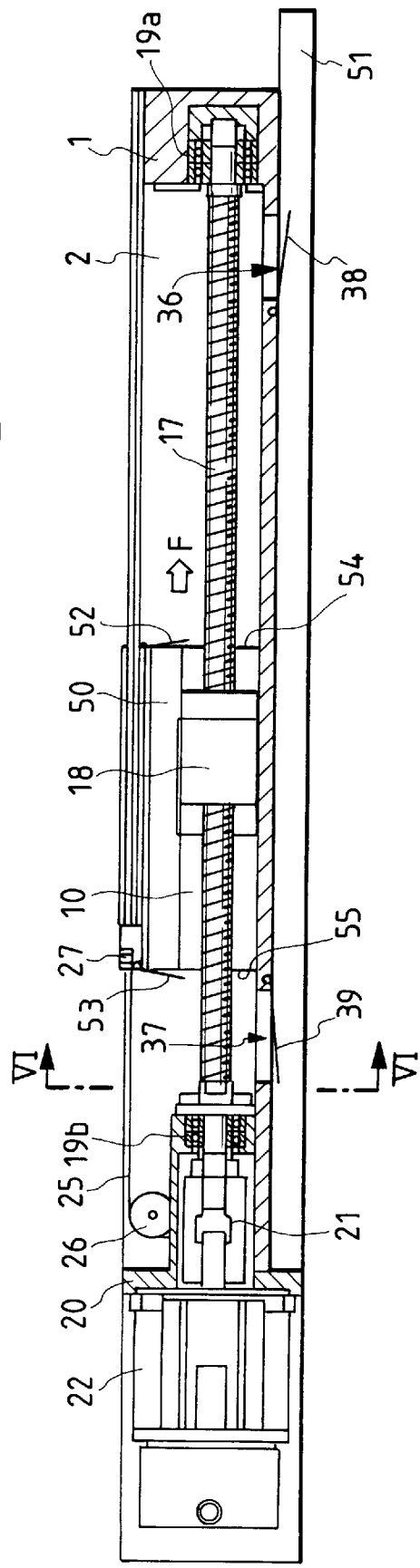
FIG. 5 is a longitudinal sectional view showing another example of the non-suction clean actuator, which is a second embodiment of the invention.
Figure 6:
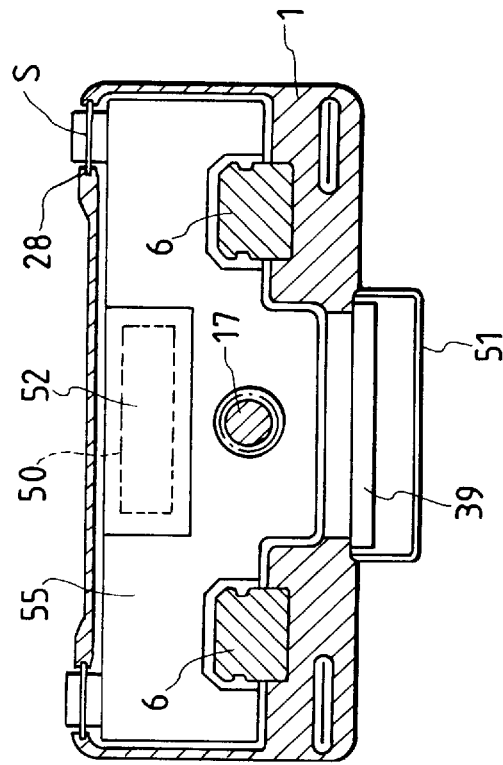
FIG. 6 is a sectional view taken along line VI—VI in FIG. 5.

In FIGS. 5 and 6, reference numerals 54 and 55 designate covers for the provision of the exhaust valves 52 and 53.

The second embodiment operates as follows: When the main carrier 10 is moved in the direction of the arrow F, the exhaust valve 52 located ahead of the main carrier as viewed in the direction of movement (the arrow F) is closed, while the exhaust valve 38 is opened. Hence, the air in the part of the main chamber 2 which is ahead of the main carrier 10 and is decreased in volume, is discharged into the exhaust duct 51 together with dust particles. At the same time, the part of the main chamber 2 which is behind the main carrier 10 is increased in volume. Hence, the exhaust valve 53 is opened, while the exhaust valve 39 is closed. Therefore, the pressure in the part of the main chamber which is behind the main carrier 10 becomes negative. The same thing may be said about the case where the main carrier 10 is moved in the reverse direction. Thus, the pressure in the inside of the main carrier which is liable to be large in the quantity of dust is kept negative at all times, and dust particles formed therein is prevented from leaking outside.

(Third Embodiment)

Figure 7:
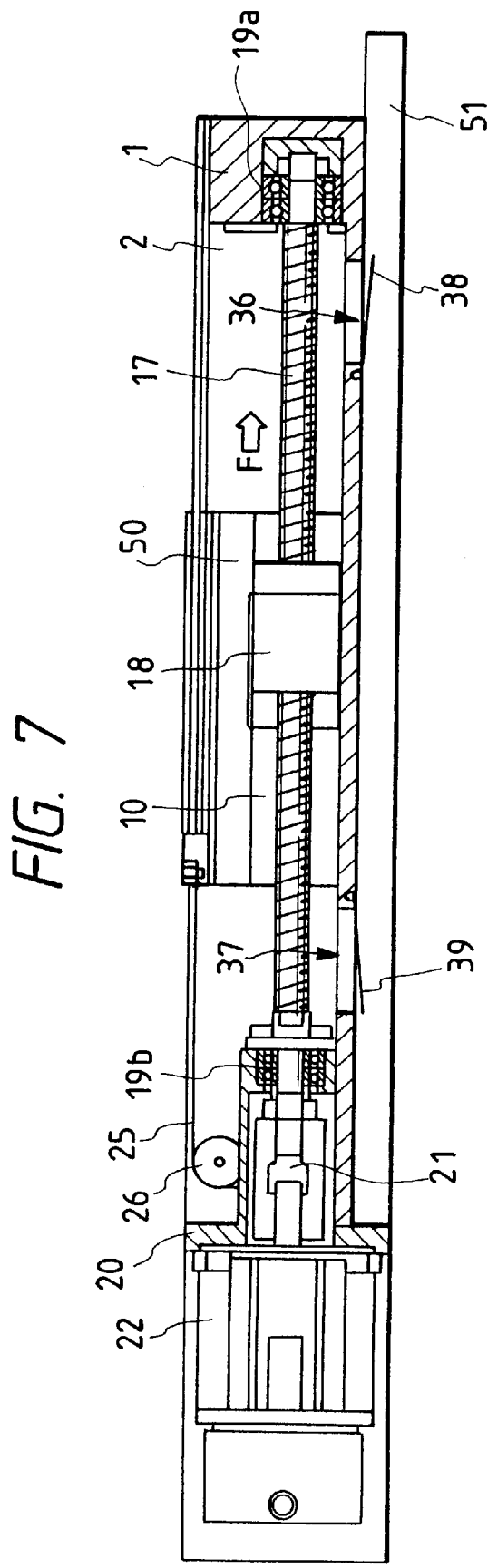
FIG. 7 is a longitudinal sectional view showing another example of the non-suction clean actuator, which is a third embodiment of the invention.

Another example of the actuator, which constitutes a third embodiment of the invention, is as shown in FIG. 7.

The third embodiment is different from the second embodiment in that no exhaust valves are provided for the front and rear openings of the through-hole 50 in the main carrier 10.

The third embodiment operates as follows: As the main carrier 10 is moved in the direction of the arrow F, the exhaust valve 38 located ahead of the main carrier 10 is opened. The air in the part of the main chamber 2 which is located ahead of the main carrier 10 and is decreased in volume is discharged into the exhaust duct 51 together with dust particles. At the same time, the pressure in the part of the main chamber 2 which is located behind the main carrier 10 and is increased in volume, becomes negative with the exhaust valve 39 closed, so that the air in the part of the main chamber which is ahead of the main carrier 10 is sucked through the through-hole 50 into the part of the main carrier 10 which is located behind the main carrier 10; that is, the dust particles are prevented from scattering outside.

(Modifications)

In the above-described embodiments, the main carrier 10 is supported by a pair of linear guide devices 4 and 4; however, the invention is not limited thereto or thereby. That is, it may be so modified that the main carrier 10 is supported a single linear guide device.

Furthermore, in the above-described embodiments, the means for moving the main carrier 10 is the ball screw; however, the invention is not limited thereto or thereby. That is, the ball screw may be replaced with conventional means such as belt-driven moving means or air-cylinder-driven moving means.

(Effect)

As was described above, the actuator comprises: the housing having a slit in the outer surface; and the conveying member which is moved back and forth in the housing along the slit, the conveying member engaging with the movable loop made up of the seal belt which is driven by the movement of conveying member while sealingly closing the slit, In the actuator, the auxiliary chamber communicated with outside is provided along the main chamber, and the main chamber and the auxiliary chamber are communicated through the exhaust valves with each other which allow air to flow, in one direction, from the main chamber to the auxiliary chamber. Hence, the exhaust valves cooperate with the movement of the conveying member to maintain the pressure in the housing negative. Thus, the resultant actuator is a non-suction type clean actuator which needs no discharge pump to reduce the pressure in the housing, and is of complete dust-proof structure.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An actuator comprising:
   a housing (1) having an outer surface on which a slit (S) elongated in an axial direction of said housing is formed;
   a conveying member (10) having a portion (10a) protruded from said housing through said slit, said portion of said conveying member being movable back and forth along said slit in said axial direction;
   a seal belt (25) for sealingly closing said slit, said seal belt being movable in said axial direction in accordance with the movement of said conveying member; and
   one-way exhaust valves (38, 39) disposed at both ends of said housing (1) in said axial direction for allowing air disposed in said housing to flow in one direction towards the outside of said housing when said conveying member is being moved.

2. The actuator according to claim 1, in which said housing comprises a partition member for partitioning the inside of said housing into a main chamber (2) within which said conveying member is moved and an auxiliary chamber (3) communicated with said outside,
   wherein said one-way exhaust valves (38, 39) are provided at both ends of said main chamber (2) in the axial direction and allow air within said main chamber to flow, in one direction, to the auxiliary chamber.

3. The actuator according to claim 2, in which said auxiliary chamber is communicated with said outside through duct members (42,43).

4. The actuator according to claim 3, further comprises:
   auxiliary one-way exhaust valves (40, 41) provided at both ends of said auxiliary chamber in the axial direction and allowing air within said auxiliary chamber to flow, in one direction, to said duct members; and
   driven member (35) coupled with said seal belt and movable within said auxiliary chamber in a direction opposite to the moving direction of said conveying member.

5. The actuator according to claim 1, further comprises:
   a plurality of pulleys on which said seal belt is laid over in such a manner that a movable loop is made up of said seal belt.

6. The actuator according to claim 1, in which the conveying member comprises:
   a through hole (50) elongated in said axial direction for communicating a front and rear chamber which are respectively defined by a space ahead of said conveying member and a space behind said conveying member when said conveying member is being moved within said housing.

7. The actuator according to claim 6, further comprising:
   exhausting valves (52, 53) disposed at both ends of said through hole (50) in said axial direction for only allowing air to flow out of said conveying member (10).

8. The actuator according to claim 6, in which an internal chamber of said housing (1) is communicated with said outside through said one-way exhausting valves and a duct member (51).

9. The actuator according to claim 7, in which an internal chamber of said housing (1) is communicated with said outside through said one-way exhausting valves and a duct member (51).

* * * * *